Patented July 21, 1942

2,290,392

UNITED STATES PATENT OFFICE 2,290,392

WAX COATING COMPOSITION AND METHOD OF PREPARATION

Gordon C. Thomas, Old Greenwich, Conn., assignor to The Lummus Company, New York, N. Y., a corporation of Delaware No Drawing. Application April 1, 1939, Serial No. 265,511

2 Claims. (Cl. 260—28)

This invention relates to a method of preparing coating compositions for use on sheet material such as paper, regenerated films, leather, etc., to impart thereto the properties of imperviousness to moisture-vapor and grease, flexibility, hardness, transparency, strength, or to insure ease of sealing, or to make a tough pliable material as may be desired.

A principal object of the invention is to provide an improved method of forming a novel coating composition for sheet materials which may be used in conjunction with conventional coating machines without change of construction or technique, and which will give the desired improved qualities of moisture-vapor-proof, strength, flexibility, etc.

Another and more specific object of the present invention is the production of waterproof paper sheets for use in wrapping and packaging food products, particularly frozen foods which are subjected to a low degree of cold.

The prior art is replete with various wax and cellulose mixtures suggested for use in coating sheet material, however, these prior compositions are objectionable for the reason that the coated paper produces cracks when bent or folded, as when packaging articles, and also soon loses its resistance to moisture vapor penetration and the like. Furthermore, when used for wrapping or packaging frozen foods in which temperatures as low as —20° or —30° F. are employed, the coated sheets of the prior art become loosened at the points where the sheets have been lapped and sealed by heat.

Sheets prepared in accordance with the present invention and utilizing a coating composition as hereinafter described, avoid these shortcomings of the prior art and produce a coated sheet having all of the desirable characteristics before enumerated.

The instant coating composition is usually compounded from scale wax, derived from any desired source, although excellent results may be obtained by using higher melting point paraffins, vegetable waxes such as carnauba, or mineral waxes such as petrolatums, or the various earth-waxes such as ceresin, montan, ozocerite, and the like and artificial rubber.

The waxeous material is intimately combined with a relatively small amount of an artificial rubber, such as "Buna," which is essentially a polymerization product of butadiene or a polymerization product of butene.

A complete technical description of "Buna" will be found in an article entitled "Specific properties of artificial "Buna" rubber" by Albert Koch, appearing in Rubber Chemistry and Technology, vol. 10, 1937, beginning on page 17. "Buna" is a standard article of commerce, being a true hydrocarbon and a non-hardenable polymer of butadiene.

In carrying out the method of producing this novel coating material, a suitable wax, either paraffinic or one of the other waxes heretofore mentioned, is liquefied by any suitable means. The desired quantity of "Buna" which, as before stated, is essentially a non-hardenable polymer of butadiene is dissolved in a solvent such as gasoline or benzine or low boiling naphtha, and thereafter the liquefied wax and the artificial rubber solution are intimately mixed while in an attenuated stream.

Preferably, although not necessarily, this mixing operation may be expeditiously carried out in an homogenizer of the type generally described in Cornell's U. S. Patent 2,042,880, patented June 2, 1936. Such apparatus produces a complete dispersion of the artificial rubber in the wax. Simultaneously with the bringing together of the two liquids, a vacuum is applied sufficient to remove the rubber solvent. When desirable, the mixing or homogenizing may also take place in the presence of heat to accelerate the solvent removal or maintain the fluidity of the materials.

The end product has approximately the same melting point as the wax stock used, and from an examination thereof it appears that the dispersion of the artificial rubber through the wax breaks down the normal crystalline formation of the wax molecules into the amorphous form.

I have found that the most successful proportions of "Buna" which may be incorporated in the wax vary from 1 to 20% and are preferably limited to the range of 5 to 15%. For coating of paper I have found that scale wax having a melting point of approximately 127° F. and refined paraffin having a melting point of 140° F. are most satisfactory.

The scale wax, due to the slight amount of oil present, appears to blend with the "Buna" and form a more complete solution. The paper coated is very flexible and quite satisfactory.

With the paraffin of 140° melting point a somewhat harder surface is obtained and the coating is non-blocking in the paper rolls. The increasing percentages of "Buna" tend to increase the flexibility of the coating and tend to increase the viscosity of the coating material.

The blending of the "Buna" in a waxeous material appears to be most satisfactorily carried out in the homogenizer, not only because of the very intimate mix possible but due to the film formation, it is possible to remove the solvent without destroying the intimate blend. It is considerably more difficult to obtain such conditions on other forms of machines, and I have been unable to merely mix or knead the "Buna" in a waxeous material as it does not produce a homogeneous permanent dispersion. The resultant blended material can, of course, be coated on a film by the usual coating processes as is generally practised.

The coating is applicable to various types of sheet material to render them either more flexible, stronger, or moisture-vapor-proof, or for the purpose of filler. I found, however, that the coating of paper gives a remarkably flexible and strong sheet which is very easily sealed by the suitable application of heat to the folded ends. A very strong bond is initially formed and this bond persists irrespective of temperature conditions and is particularly satisfactory at the very low temperatures common with frozen foods.

A paper coating of the blended "Buna" and paraffin wax also has a very high moisture-vapor-proof quality. On comparative tests it is substantially better than "Cellophane" and is nearly as satisfactory as metal films. It is possible to obtain a moisture-vapor-proof quality of moisture-vapor transfer of one gram per square meter for twenty-four hours or less.

Although "Buna" appears to be the most satisfactory blending agent and paraffin the most satisfactory body material, I have also successfully blended vinyl-acetate in paraffin using methyl ethyl ketone as the solvent and such product can also be most effectively blended on the homogenizer, which forms the necessary intimate dispersion.

While I have described a preferred form of embodiment of my invention, I am aware that modifications may be made thereto and I, therefore, desire a broad interpretation of my invention within the scope and spirit of the description herein and of the claims appended hereinafter.

What I claim is:

1. The method of preparing a flexible, moisture proof, non-cracking coating composition for use with cellulosic sheets which consists in dispersing a polymerization product of butadiene in a wax while both materials are maintained in a fluid state, said dispersion being carried out in an attenuated stream subjected to a substantial centrifugal force whereby a homogeneous mixture is formed which will not separate into its constituents on continued melting and congealing.

2. The method of preparing coating material for use with cellulosic sheets which consists in homogenizing a liquefied paraffin wax in the melting point range of 127 to 140° F. and an artificial rubbery polymer of butadiene suspended in a suitable solvent, the said homogenizing being carried out in an attenuated stream subjected to a substantial centrifugal force whereby a homogeneous mixture is formed which will not separate into its constituents on continued melting and congealing and taking place in the presence of heat and vacuum sufficient to continuously vaporize the solvent.

GORDON C. THOMAS.